United States Patent
Buero

(10) Patent No.: US 7,143,541 B2
(45) Date of Patent: Dec. 5, 2006

(54) FISHING RELEASE APPARATUS

(76) Inventor: William J. Buero, 14710 Lutz, Warren, MI (US) 48088

( * ) Notice: Subject to any disclaimer, the term of this patent is extended or adjusted under 35 U.S.C. 154(b) by 29 days.

(21) Appl. No.: 11/099,875

(22) Filed: Apr. 6, 2005

(65) Prior Publication Data

US 2005/0223622 A1    Oct. 13, 2005

Related U.S. Application Data

(60) Provisional application No. 60/560,096, filed on Apr. 7, 2004.

(51) Int. Cl.
*A01K 95/00* (2006.01)
(52) U.S. Cl. .............. 43/43.12; 43/27.4; 43/44.87
(58) Field of Classification Search ............ 43/43.12, 43/43.1, 43.13, 27.4, 44.87
See application file for complete search history.

(56) References Cited

U.S. PATENT DOCUMENTS

| | | | |
|---|---|---|---|
| 3,874,110 A | 4/1975 | Larson | 43/43.12 |
| 4,015,362 A | 4/1977 | Johnson | 43/43.11 |
| 4,173,091 A | 11/1979 | Emory, Jr. | 43/43.12 |
| 4,261,130 A | 4/1981 | Cudnohufsky | 43/43.12 |
| 4,417,414 A | 11/1983 | Hood et al. | 43/43.12 |
| 4,656,776 A | 4/1987 | Macachor | 43/43.12 |
| 4,809,457 A | 3/1989 | Macachor | 43/43.12 |
| 4,856,224 A | 8/1989 | Fincher, Sr. | 43/43.12 |
| 4,872,281 A | 10/1989 | Burgess | 43/43.12 |
| 4,905,401 A | 3/1990 | Fukumoto | 43/43.12 |
| 4,945,670 A | 8/1990 | Wetherald | 43/43.12 |
| 5,177,894 A | 1/1993 | Dunsford | 43/43.12 |
| 5,197,223 A | 3/1993 | Spurgeon | 43/43.12 |
| 5,495,691 A | 3/1996 | Keisala | 43/43.12 |
| D381,390 S | 7/1997 | Stotesbury et al. | D22/134 |

*Primary Examiner*—Darren W. Ark
*Assistant Examiner*—John D. Holman
(74) *Attorney, Agent, or Firm*—Gifford, Krass, Groh, Sprinkle, Anderson & Citkowski, P.C.

(57) ABSTRACT

An apparatus for releasably securing an intermediate location of a baited fishing line to a weighted and fixed underwater line. The apparatus includes an interiorly hollowed and substantially rectangular elongated sleeve having first and second ends. An elongated slide exhibits axially and outwardly tapered side walls axially which are frictionally engageable within associated inner side walls of the sleeve proximate a first selected and open end of the sleeve, the intermediate location of the fishing line being pinchingly engaged between the slide and the sleeve interior. A further selected end of the sleeve engages the fixed underwater line. Upon a fish striking a baited and trailing end of the fishing line, a substantially linear applied force causes said slide to linearly eject outwardly from within said sleeve, releasing the fishing line therefrom.

8 Claims, 5 Drawing Sheets

FISHING RELEASE APPARATUS

CROSS REFERENCE TO RELATED APPLICATIONS

The present application claims the priority of U.S. Provisional Patent Application Ser. No. 60/560,096, filed Apr. 7, 2004, and entitled "Fishing Release Apparatus".

BACKGROUND OF THE INVENTION

1. Field of the Invention

The present invention relates generally to release mechanisms associated with a weighted downrigger or trail along trolling line. More specifically, the present invention teaches an effective release mechanism for a fishing line associated with a downrigger line, associated weight or, in a separate application, a trolling line. The release mechanism operates to maintain a steady degree of tension to a length of the fishing line extending from the reel to its engaging location with the release mechanism, coupled with effective release upon a fish engaging a bait associated with a trailing edge of the fishing line extending from the release mechanism.

2. Description of the Prior Art

A fishing method known as deep trolling involves the use of special equipment. A weight, often streamlined, is secured to a cable with a winch to a point at or below the level at which fish are believed to be located. As is known in the art, the level and location of the fish may be determined through the use of electronic depth finding equipment or other conventional means.

As the cable is unwound from the reel of the winch, lowering the weight, a location of a pole secured and reelable fishing line, typically having bait attached to an end thereof, is clipped to a release device in turn secured to the cable, and in order that the fish line will be lowered to a position in the vicinity of the fish. These devices are designed so that a pull corresponding to a fish taking the bait will provide enough force to pull the fish line free of the clip, leaving the fish line to the exclusive control of the fishing rod typically arrayed upon the boat at a location separate from the downrigger assembly.

Several of such devices are available for attachment to the downrigger cable and operate to release the fish line upon the fish taking the bait. However, a problem that exists with many of these types of devices is that they are highly susceptible to false releases when not secured to the fish line tight enough or the devices operate to cause damage to the fish line when they are applied too tightly. Additionally, many of these types of devices do not allow for the line release force to be adjusted appropriately for the size and type of fish being sought after.

Selected examples drawn from the prior art include U.S. Pat. No. 4,031,652, issued to Johnson, and which teaches a fishing line release mechanism having a permanent magnet positioned within a housing. The poles of the magnet are arranged to draw a magnetic release plate toward, or into contact with, the magnet. The release plate has a buttonlike configuration with a central aperture which enables the plate to be threaded by a fish line. When a fish line threaded through the magnetic plate aperture is looped several times around the plate and the plate is then positioned in proximity to the permanent magnet, the line cannot unreel until considerable tension is applied to it. The tension limit can be preset and, upon that limit being reached, the buttonlike magnetic plate springs away from the permanent magnet to release the fish line to further control by the reel.

U.S. Pat. No. 4,417,414, issued to Hood, teaches a fishing line release mechanism for a downrigger or the like in which there are two claims for holding the fishing line and a cam. Each clip is separately tensioned, preferably adjustable. The clip engaging the upper fishing line segment is pivotally and eccentrically connected to the cam while the clip for the outward segment of the fishing line is fixedly connected to the center of the cam. The line is guided by grooves from the upper to the lower clip. Release of either clip causes the other clip to release, thus causing the entire fishing line to drop free from the mechanism.

U.S. Pat. No. 5,495,691, issued to Keisala, teaches a device for linking a trolling line to a wire of a downrigger or a sideplaner so that a triggering force from the direction of the lure attached to one end of the trolling line is freely adjustable without affecting the coupling adjustment between the rod and the device, and between the device and the wire. The device can be released from the cable by a sharp pull from the direction of the rod, and then reeled up to the surface and to the boat.

A still further reference of note is U.S. Pat. No. 4,905,401, issued to Fukumoto, and which teaches a trolling line retainer and release device for use with downriggers or outriggers comprising a conical magnet molded into a hinged cap and a mating threaded conical magnetically permeable closure containing components used to attach the invention to a downrigger or outrigger cable. The latching cap securing the line at one end of the cap that is pinned at the diametrically opposite end to provide a moment to delatch the magnet upon a fish striking the lure or bait. The magnetic biased line retainer consists of two elastomer pads shaped to provide a serpentine path to secure the line. The retention force of the line is adjustable by varying the gap between the magnet and the magnetically permeable closure. The cable attachment mechanism is spring biased to provide a shear force between a piston and the cylindrical housing. The position of the piston can be changed by a simple rotation of a lever, located at the rear of the housing, to unlock the cable and permit free sliding movement of the device. Conversely, the device can be locked on the cable by returning the lever to its normal position.

SUMMARY OF THE PRESENT INVENTION

The present invention overcomes the above disadvantages associated with prior art fishing releases in providing a fishing release operative to be selectively secured to a cable and/or weight of a fishing downrigger, and wherein the release is operative to allow for the line release force to be adjusted to an appropriate level for trolling various types and sizes of lures and baits.

In particular, the apparatus includes an interiorly hollowed and substantially rectangular elongated sleeve having first and second open ends. An elongated slide exhibits axially and outwardly tapered side walls which are axially and frictionally engageable within associated inner side walls of the sleeve proximate a first selected and open end of the sleeve. The intermediate location of the fishing line is pinchingly engaged between the slide and the sleeve interior.

A longitudinal slot extends an axial distance along the sleeve, typically along a top extending edge. A portion associated with the inserted slide projects through the slot and defines a range of axial travel established between the slide and sleeve.

A further selected end of the sleeve engages, in certain applications, a location of the fixed underwater (downrigger) line or, in the alternative, a weight extending from an end of the line. In a yet further variant, a rearwardly trailing and trolling line is employed and from which any plurality of release apparatuses are secured at spaced locations.

In any of the above disclosed variants, and upon a fish striking a baited and trailing end of the fishing line, a substantially linear applied force causes the slide to linearly eject from within the sleeve, releasing the fishing line therefrom. In a preferred configuration, the slide includes an arcuate extending edge wall for assisting in securing the line in the pinched condition within the sleeve and prior to axial release.

A feature of the invention is the ability to maintain a steady tension on the portion of the fishing line extending from a pole to the engaged location with the release apparatus. In this manner, and by virtue of the construction of the release apparatus, the line tension is not affected by waves, weather or boat speed. Incidences of false release are further greatly reduced by the construction of the invention.

BRIEF DESCRIPTION OF THE DRAWINGS

A better understanding of the present invention will be had upon reference to the following detailed description when read in conjunction with the accompanying drawings in which like parts are given like reference numerals and wherein.

DESCRIPTION OF THE INVENTION

The present invention provides a fishing release operative to be tightly secured to the cable of a downrigger whereby the position of the release on the cable is maintained during unsettled or choppy water conditions, false releases are minimized, and to provide adjustability of the fishing line release force to facilitate trolling various types and sizes of lures and baits.

Figure 1:
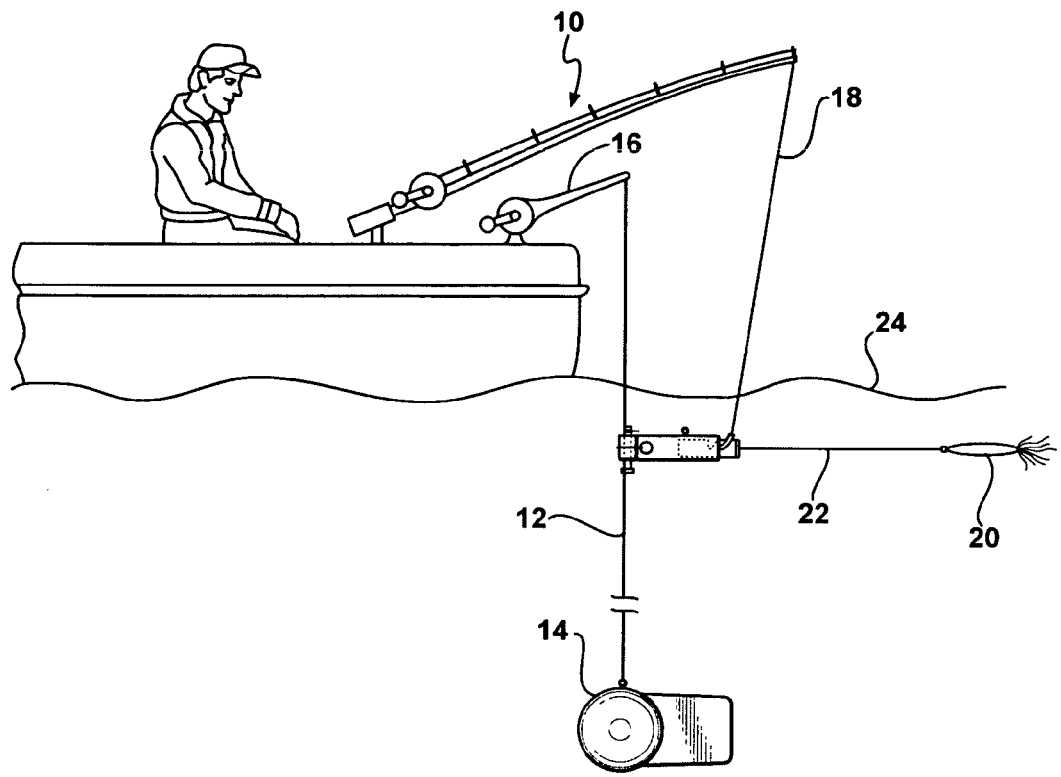
FIG. 1 illustrates the fishing release apparatus of the present invention according to a first preferred application in use with a downwardly extending line associated with a conventional downrigger apparatus.

Referring to FIG. 1, a fishing release apparatus 10 according to the invention is generally illustrated. As shown, the fishing release 10 may be attached to a cable 12 and/or weight 14 of a conventional downrigger 16, whereby a fishing line 18 may be releasably fastened thereto for allowing a user to maintain a fishing lure 20 secured to a trailing end 22 of the fishing line at a desired depth below a water level 24.

Figure 6:
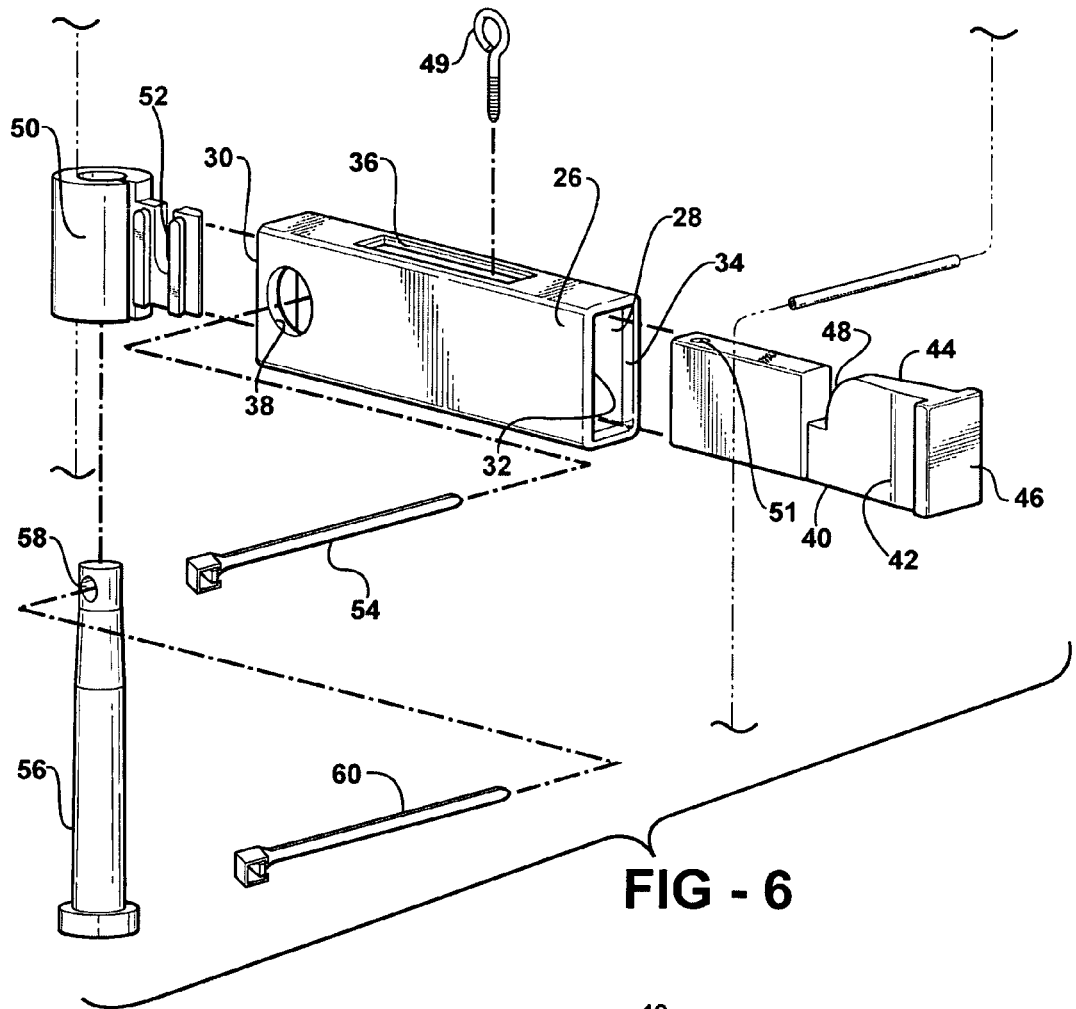
FIG. 6 is an exploded view of the fishing release apparatus according the present invention.
Figure 7:
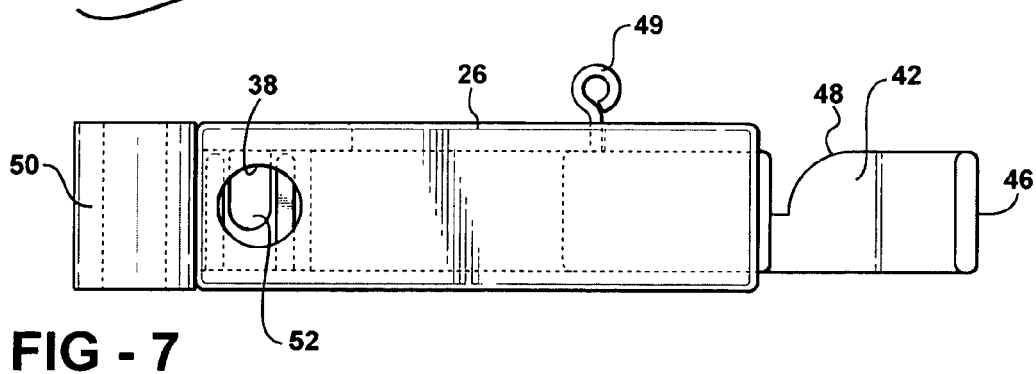
FIG. 7 is a front plan view of the fishing release apparatus.
Figure 8:
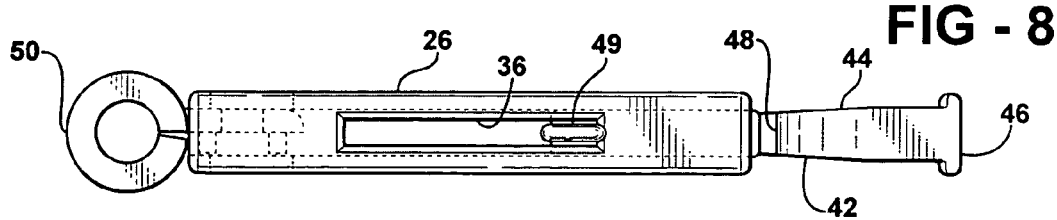
FIG. 8 is a top view of the fishing release apparatus.

As best illustrated in the exploded view of FIG. 6 and front and top plan views of FIGS. 7 and 8, the release apparatus includes an interiorly hollow, typically rectangular elongated, sleeve 26, typically constructed of a durable plastic and having a first open end 28 and a second open end 30. The open interior of the sleeve 26 is further defined by interior and exterior sidewalls, such as shown at 32 and 34 in FIG. 6, and top and bottom interconnecting and linear extending end walls. Additional features include a longitudinal slot 36 extending an axial distance along the sleeve, as well as an aperture 38 being formed through the sleeve proximate its further selected and open end 30.

A sliding release member 40, see again as best shown in FIG. 6, is also typically constructed of a durable plastic and dimensioned for slip (frictional engaging) fit engagement within the interior side walls of the sleeve 26. The release member 40 includes sidewalls 42 and 44 that are outwardly tapered portions adjacent a proximal end 46. The tapered portions of the sidewalls are such that their thickness is progressively greater than a thickness of a foremost inserting portion of the release member 40 when moving from proximal to distal ends. An arcuate edge is further referenced at 48 and facilitates gripping of the associated location of the fishing line as will be further described. An eyehook screw 49 engages an aperture location 51 associated with the slide and, accordingly, restrains the travel of the slide a given axial travel along the sleeve and defined by the ends of the longitudinal slot.

The sliding release member 40 is operative to become increasingly wedgedly retained within the sleeve 26 as it is pushed through the open end 28 of the sleeve toward the second open end 30. It is appreciated that the increase in retaining force results from the tapered nature of the sidewalls of the slide relative to the sleeve wedgedly engaging as it is pushed toward the second open end.

The retaining force is due to surface friction between the interior side walls 32 and 34 of the sleeve and the tapered axial surfaces 42 and 44 of the slide. In this manner the degree of release force can be adjusted accordingly by adjusting the position of the slide within the sleeve to either increase or decrease the amount of frictional force. Illustratively, for maximum release force the slide 40 is pushed through the first open end 28 toward the second open end 30 to a maximum positioned along the longitudinal axis of the sleeve 26. Contrastingly, to adjust the slide 40 to a minimum release force, the same is inserted through the open end 28 of the sleeve 26 to a point where resistance against forward movement of the slide within the sleeve just begins.

It is also envisioned that the tapered axial surfaces 42 and 44 can be constructed of a soft plastic, rubber or fabric material, and within the scope of the invention. In this fashion, the pads operate to cushion the line, prevent tangling and fouling, etc.

Referring again to FIG. 6, a collar 50 is provided through which extends the weighted line 12. A projecting portion 52, otherwise known as an arcuate interlock portion, associated with the collar 50 engages through the second open end 30 of the sleeve and in alignment with its open aperture 38. A tie zip fastener 54 loops through the aperture and around the collar and weighted line location, in order to secure the sleeve 26 to the collar 50.

An elongated and tapered pin 56 engages through an open center associated with the collar 50 and in order to affix the apparatus at a selected location along the weighted line. A crosswise extending opening 58 in an end of the pin 56 receives a further tie zip fastener 60 to secure the same in frictional holding fashion through the collar 50 and to thereby position the apparatus at a desired depth. This fastening arrangement prevents the locking pin 56 from falling into the water and being lost once it becomes dislodged from the interior channel of the collar 50 as the fastener operates to retain the locking pin about the cable while permitting the cable to be winched up.

Figure 2:
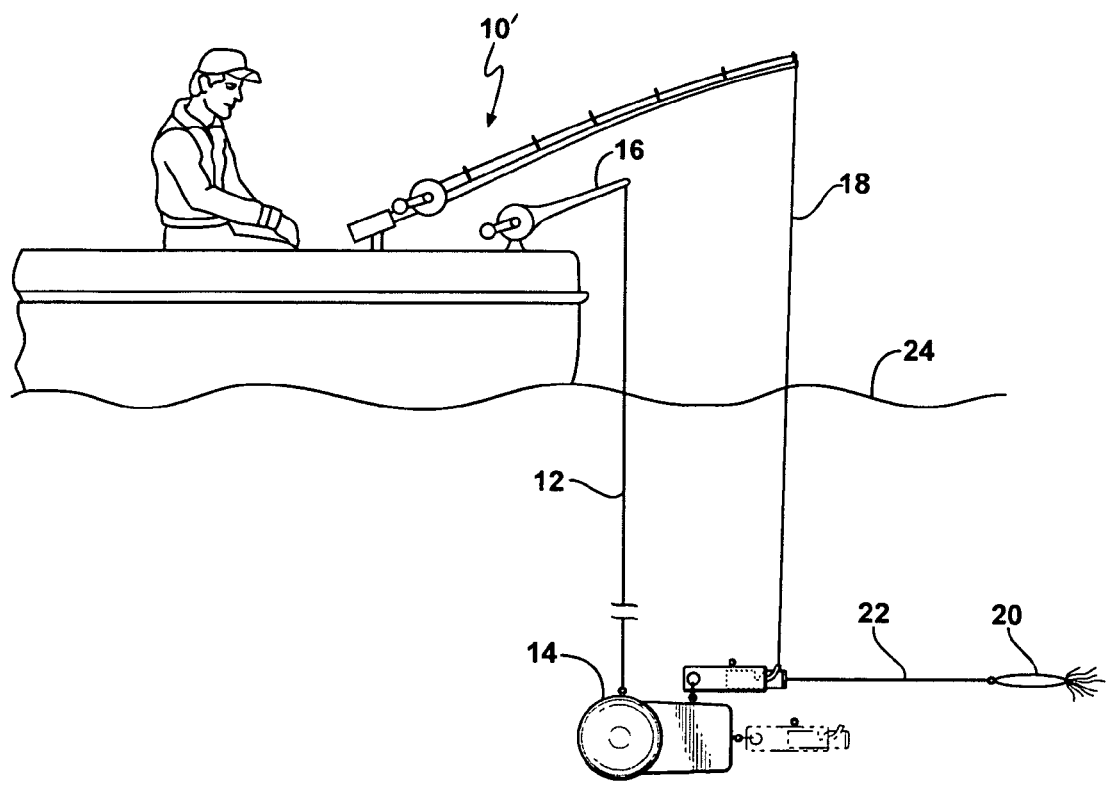
FIG. 2 illustrates the fishing release apparatus of FIG. 1 in either of first or second affixing locations relative to a downrigger weight.
Figure 3:
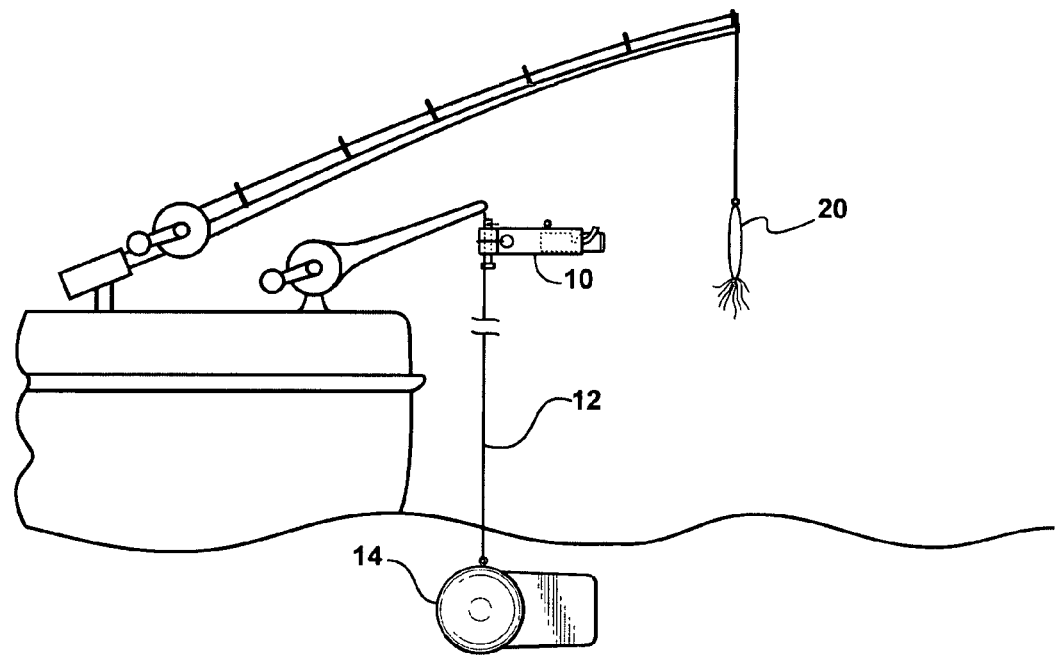
FIG. 3 illustrates a release condition of a fishing line relative to the apparatus illustrated in the embodiment of FIG. 1.
Figure 4:
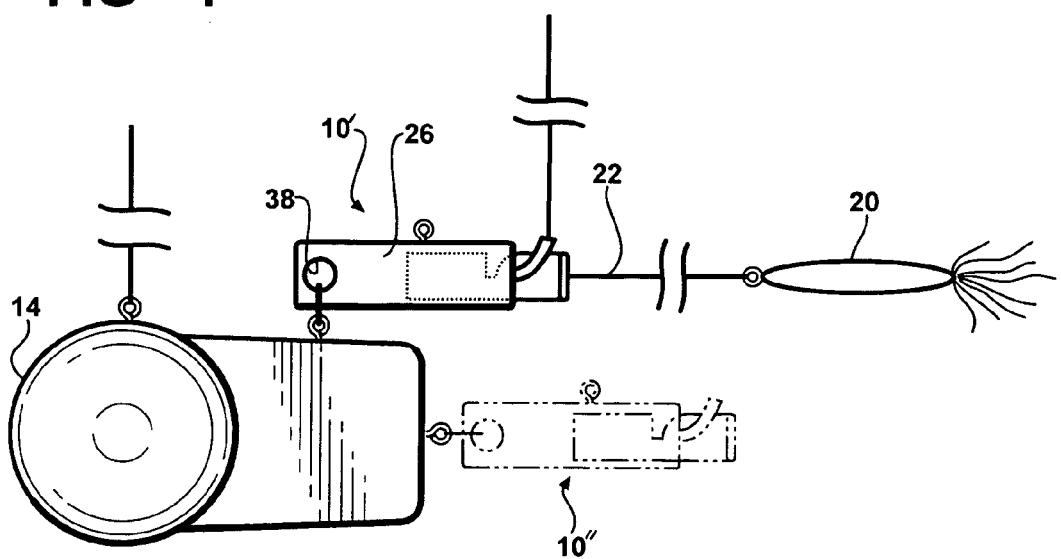
FIG. 4 is an enlarged sectional illustration of the downrigger arrangement of FIG. 2 and better showing the first and second affixing locations relative the downrigger weight.
Figure 5:
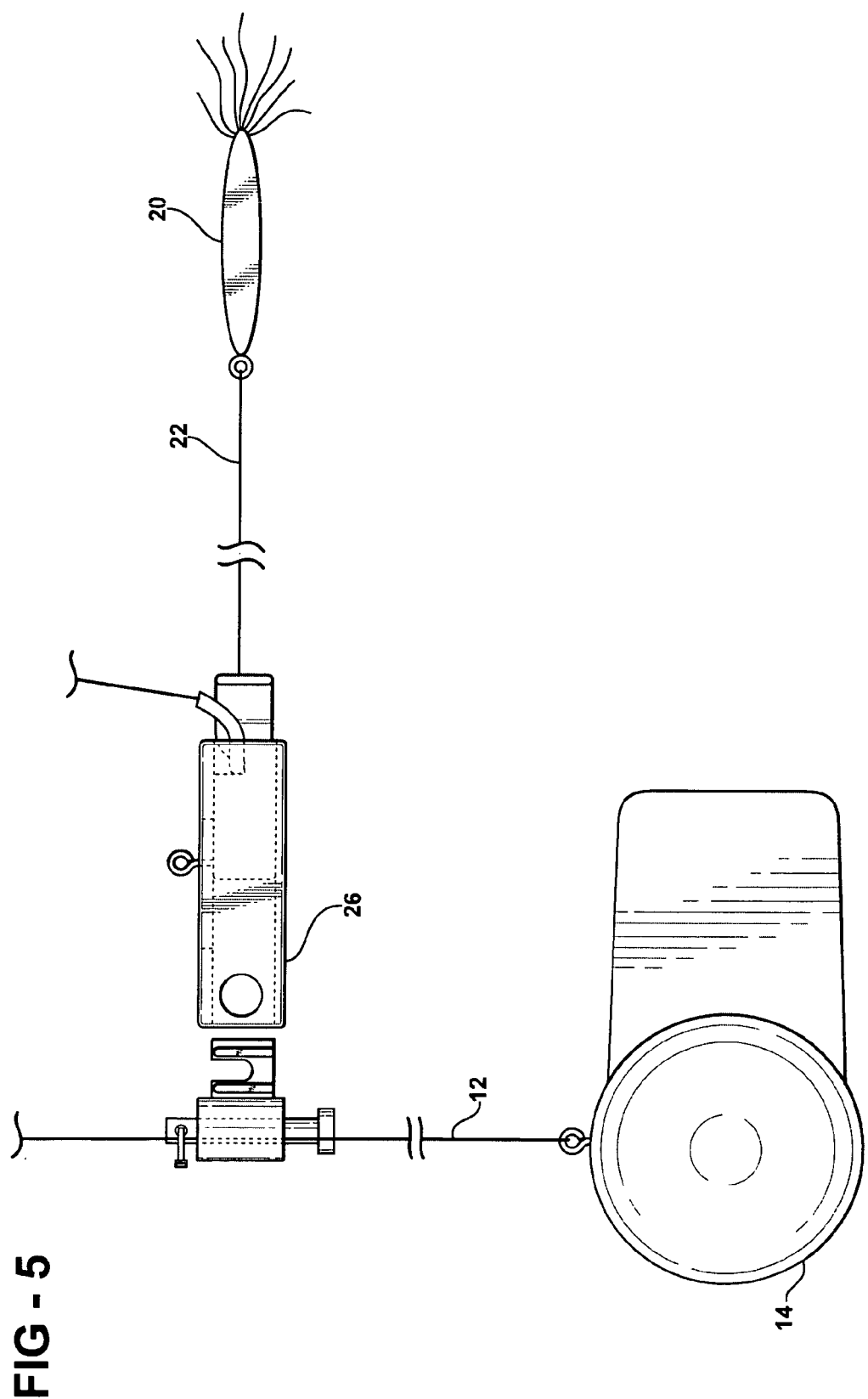
FIG. 5 is an enlarged sectional view of the fishing release apparatus of FIG. 1 and better illustrating the manner in which the tapered slide axially engages inside the release body and in order to secure a location of the fishing line in false release preventative fashion.

In a further preferred variant, and as specifically shown in each of FIGS. 2 and 4, the sleeve 26 is dimensioned so as to be adapted to engage the weight 14 associated with the weighted line 12. In particular, and as evidenced at 10' or 10" in FIG. 4, a zip tie or the like is employed to engage through the aperture 38 in the sleeve and to secure the same to an eyelet extending from either of upper or forward locations associated with the weight 14.

Figure 9:
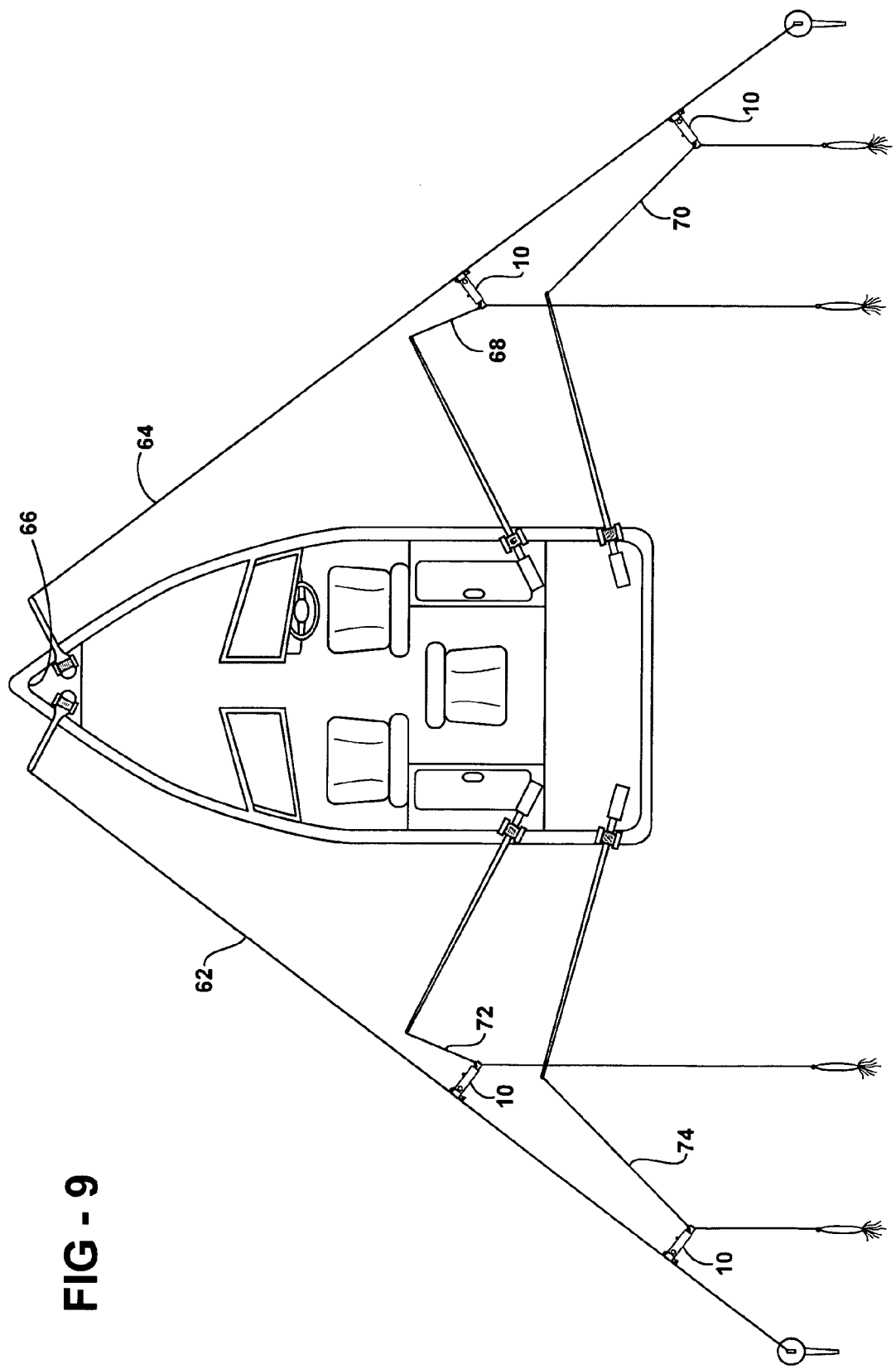
FIG. 9 is an illustration of the fishing release apparatus according to a further preferred embodiment of the present invention and in use with a trolling line associated with a boat.

As further referenced in FIG. 9, a pair of rearwardly and outwardly trailing trolling lines 62 and 64, are arrayed in supported fashion relative to such as a bow location 66 of a trolling boat. Each trolling line 62 and 64 supports at least one, and preferably two or more, individually located release apparatuses and such that a plurality of associated fishing lines 68, 70, 72 and 74, extend from associated pole locations mounted to the boat and engage with selected release apparatuses which are in turn affixed to specified locations along each of the trolling lines. The sleeves 26 associated with each of the release apparatuses are typically mounted in the same fashion as described in reference to FIGS. 6–8, it being further understood that other mechanisms for securing to fixed locations along the trolling lines are also envisioned within the art.

As further shown, the fishing release 10 is adapted to be attached to the weight at the second open with a conventional fastening means such as a tie strap, string, screws, pins, or other conventional fastening means known to those skilled in the art.

Due to the manner in which the slide engages the sleeve, the concern for inadvertent releases is substantially minimized as the slide becomes disengaged from its set position by the fish taking hold of the bait and pulling in a direction opposite the forward movement of the lure 20. Once the line is released from the fishing release 10, the released tension on the line being exerted by the fishing rod causes the hook to be set in the fish. The fishing release 10 is adapted to only release the line upon the fish taking the bait. This allows for line tension to be kept at a maximum via the fishing rod such that the hook will set in the fish due to the recoil of the fishing rod when line tension is released with the fish taking the bait. Additionally, the collar and tapered locking pin prevent movement of the fishing release 10 along the rigging or trolling cable. Thus, the fishing release 10 will not be moved up or down from its secure point in rough or choppy waters.

Also, and while the illustration of FIG. 9 does show tapered pins 56 inserted through the associated collars 50, it is understood that the preferred embodiment illustrated does not utilize the pins. Rather, the trolling lines 62 and 64 extend loosely through the central openings of the collars 50 associated with each of the release apparatuses (see also FIGS. 7 and 8), the fishing lines 68–74 operating to prevent sliding beyond a given desired location of each of the trailing trolling lines.

It is also envisioned that the pins 56 may also be removed in application to the downrigger line, the interengaged fishing line again operating to secure the apparatus at a desired location. The apparatus in these instances will free-fall and gather at the bottommost or outermost (trolling) locations following detachment of the fishing line.

From the foregoing, a fishing release for use with a weighted downrigger or outrigger is disclosed. Having the described the fishing release, however, it is appreciated that many modifications thereto may become apparent to one of skill in the art without deviation from the spirit of the invention as defined by the scope of the appended claims.

I claim:

1. An apparatus for releasably securing an intermediate location of a baited fishing line to a fixed underwater location in combination with a weighted line, said apparatus comprising:
    an interiorly hollow sleeve having first and second ends;
    a slide axially and frictionally engageable within a selected and open end of said sleeve, the intermediate location of the fishing line being pinchingly engageable between said slide and said sleeve interior;
    a further selected end of said sleeve engaging said fixed underwater location which is located along said weighted line;
    said weighted line for engaging said sleeve through an opening associated with said further selected end;
    a collar through which extends the weighted line, a projecting portion associated with said collar engaging through said opening in said further selected end of said sleeve;
    an aperture being formed through said sleeve proximate said further selected end, a tie zip fastener looping through said aperture and around said collar;
    an elongated and tapered pin engageable through an open center associated with said collar and in order to affix said apparatus at said fixed underwater location along said weighted line; and
    wherein upon a fish striking a baited and trailing end of the fishing line, a substantially linear applied force causing said slide to linearly eject from within said sleeve, releasing the fishing line therefrom.

2. The apparatus as described in claim 1, further comprising a longitudinal slot extending an axial distance along said sleeve, a portion associated with the inserted slide projecting through said slot and defining a range of axial travel established between said slide and sleeve when said slide is inserted within said sleeve.

3. The apparatus as described in claim 1, said slide further comprising axially and outwardly tapered side walls engageable against corresponding and opposing inner walls associated with said sleeve.

4. The apparatus as described in claim 1, further comprising a crosswise extending opening in an end of said pin receiving a further tie zip fastener.

5. The apparatus as described in claim 1, each of said sleeve and slide having a specified shape and size and being constructed of a durable plastic.

6. An apparatus for releasably securing an intermediate location of a baited fishing line to a weighted and fixed underwater line in combination with said weighted and fixed line, said apparatus comprising:
    an interiorly hollowed and substantially rectangular elongated sleeve having a first selected and open end and a second selected end;
    an elongated slide exhibiting axially and outwardly tapered side walls axially and frictionally engageable within associated inner side walls of said sleeve proximate said first selected and open end of said sleeve, the intermediate location of the fishing line being pinchingly engageable between an arcuate edge wall associated with said slide and insertable into said sleeve interior;

a further selected end of said sleeve engaging the weighted and fixed underwater line;

a collar through which extends the weighted line, a projecting portion associated with said collar engaging through an opening in said second selected end of said sleeve;

an aperture being formed through said sleeve proximate said second selected end, a tie zip fastener looping through said aperture and around said collar;

an elongated and tapered pin engageable through an open center associated with said collar and in order to affix said apparatus at a selected location along said weighted line; and upon a fish striking a baited and trailing end of the fishing line, a substantially linear applied force causing said slide to linearly eject from within said sleeve, releasing the fishing line therefrom.

7. The apparatus as described in claim 6, further comprising a longitudinal slot extending an axial distance along said sleeve, a portion associated with the inserted slide projecting through said slot and defining a range of axial travel established between said slide and sleeve when said slide is inserted within said sleeve.

8. The apparatus as described in claim 7, said projecting slide portion further comprising an eyelet screw.

* * * * *

UNITED STATES PATENT AND TRADEMARK OFFICE
CERTIFICATE OF CORRECTION

PATENT NO. : 7,143,541 B2 Page 1 of 1
APPLICATION NO. : 11/099875
DATED : December 5, 2006
INVENTOR(S) : William Buero It is certified that error appears in the above-identified patent and that said Letters Patent is hereby corrected as shown below:

Column 3, line 46, after "according" insert --to--

Column 6, line 4, after "having" delete "the"

Signed and Sealed this

Seventeenth Day of April, 2007

JON W. DUDAS
*Director of the United States Patent and Trademark Office*